(12) United States Patent
Somasundaram et al.

(10) Patent No.: US 8,976,662 B2
(45) Date of Patent: Mar. 10, 2015

(54) APPARATUS AND METHOD FOR OPPORTUNISTIC RELAY ASSOCIATION

(71) Applicant: QUALCOMM Incorporated, San Diego, CA (US)

(72) Inventors: Kiran K. Somasundaram, San Diego, CA (US); Siddhartha Mallik, San Diego, CA (US); Anastasios Stamoulis, San Diego, CA (US); Aleksandar Damnjanovic, Del Mar, CA (US); Naga Bhushan, San Diego, CA (US); Dexu Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 13/762,302

(22) Filed: Feb. 7, 2013

(65) Prior Publication Data
US 2013/0223324 A1 Aug. 29, 2013

Related U.S. Application Data

(60) Provisional application No. 61/597,059, filed on Feb. 9, 2012.

(51) Int. Cl.
| | |
|---|---|
| *H04L 12/725* | (2013.01) |
| *H04W 4/00* | (2009.01) |
| *H04L 12/28* | (2006.01) |
| *H04W 36/00* | (2009.01) |
| *H04W 16/26* | (2009.01) |
| *H04W 36/20* | (2009.01) |

(Continued)

(52) U.S. Cl.
CPC ............ *H04W 16/26* (2013.01); *H04W 36/20* (2013.01); *H04W 36/22* (2013.01); *H04W 48/20* (2013.01); *H04W 84/047* (2013.01)
USPC ............ 370/235; 370/332; 370/431; 455/437

(58) Field of Classification Search
USPC .............. 370/229–238.1, 310–350, 431, 437; 455/431–464
See application file for complete search history.

(56) References Cited

U.S. PATENT DOCUMENTS

| | | | |
|---|---|---|---|
| 6,353,742 B1 * | 3/2002 | Bach .............................. | 455/453 |
| 6,748,212 B2 * | 6/2004 | Schmutz et al. .............. | 455/424 |

(Continued)

FOREIGN PATENT DOCUMENTS

| | | |
|---|---|---|
| EP | 2355579 A1 | 8/2011 |
| WO | 2009097070 A1 | 8/2009 |

(Continued)

OTHER PUBLICATIONS

International Search Report and Written Opinion—PCT/US2013/025438—ISA/EPO—Jun. 17, 2013.

(Continued)

*Primary Examiner* — Tri H Phan
(74) *Attorney, Agent, or Firm* — Arent Fox LLP

(57) ABSTRACT

A method, an apparatus, and a computer program product for associating a user equipment (UE) with a relay in a wireless network are provided. The apparatus determines a relay backhaul link quality of a relay; determines a path loss from a UE to the relay; and compares the relay backhaul link quality to a direct link quality between the UE and a base station, and the path loss to a path loss threshold to determine whether to associate the UE with the relay.

39 Claims, 10 Drawing Sheets

(51) Int. Cl.
*H04W 36/22* (2009.01)
*H04W 48/20* (2009.01)
*H04W 84/04* (2009.01)

(56) References Cited

U.S. PATENT DOCUMENTS

| | | | |
|---|---|---|---|
| 7,620,003 B2* | 11/2009 | Ramachandran | 370/315 |
| 7,620,370 B2* | 11/2009 | Barak et al. | 455/67.13 |
| 7,797,018 B2* | 9/2010 | Chandra | 455/552.1 |
| 8,185,060 B2 | 5/2012 | Agashe et al. | |
| 8,228,853 B2 | 7/2012 | Ji et al. | |
| 8,270,374 B2* | 9/2012 | Cai et al. | 370/332 |
| 8,457,674 B2* | 6/2013 | Sandhu et al. | 455/522 |
| 8,619,566 B2* | 12/2013 | Szymanski | 370/230 |
| 2009/0197588 A1* | 8/2009 | Khandekar et al. | 455/422.1 |
| 2009/0264123 A1* | 10/2009 | Agashe et al. | 455/434 |
| 2010/0128697 A1* | 5/2010 | Choi-Grogan | 370/332 |
| 2012/0028627 A1 | 2/2012 | Hunzinger | |
| 2012/0063383 A1* | 3/2012 | Barbieri et al. | 370/315 |
| 2012/0093059 A1 | 4/2012 | Bai et al. | |
| 2012/0202498 A1 | 8/2012 | Sachs et al. | |
| 2012/0276899 A1 | 11/2012 | Kolding et al. | |
| 2012/0282934 A1 | 11/2012 | Simonsson et al. | |

FOREIGN PATENT DOCUMENTS

| | | | |
|---|---|---|---|
| WO | 2009131898 A1 | 10/2009 | |
| WO | WO2009/131898 A1 * | 10/2009 | ............ H04W 48/20 |
| WO | 2011094644 A1 | 8/2011 | |

OTHER PUBLICATIONS

Research in Motion et al: "Serving Cell Selection in a Type 1 Relay Network", 3GPP Draft; R2-100409, 3rd Generation Partnership Project (3GPP), Mobile Competence Centre; 650, Route Des Lucioles; F-06921 Sophia—Antipolis Cedex; France, vol. RAN WG2, No. Valencia, Spain; 20100118, Jan. 12, 2010, XP050421067, [retrieved on Jan. 12, 2010].

* cited by examiner

APPARATUS AND METHOD FOR OPPORTUNISTIC RELAY ASSOCIATION

CROSS-REFERENCE TO RELATED APPLICATION(S)

This application claims the benefit of U.S. Provisional Application Ser. No. 61/597,059, entitled "Apparatus and Method for Opportunistic Relay Association" and filed on Feb. 9, 2012, which is expressly incorporated by reference herein in its entirety.

BACKGROUND

1. Field

The present disclosure relates generally to communication systems, and more particularly, to apparatuses, methods and products for opportunistic relay association.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system.

Wireless communication systems can also employ one or more relays to extend coverage of one or more eNBs and/or support communications with a number of UEs. For example, the relays can facilitate communication between the eNBs and the UEs by relaying packets there between. In one example, the relays can communicate with one or more eNBs over a wireless backhaul link, and with one or more UEs over provided wireless access links. Current association algorithms for selecting eNBs for UEs may be insufficient for associating UEs with relays as the current algorithms utilize a received signal power or path loss to associate UEs with the eNBs.

SUMMARY

In an aspect of the disclosure, a method, a computer program product, and an apparatus for associating a user equipment (UE) with a relay in a wireless network are provided. The apparatus determines a relay backhaul link quality of a relay, determines a path loss from a UE to the relay, and compares the relay backhaul link quality to a direct link quality between the UE and a base station, and the path loss to a path loss threshold to determine whether to associate the UE with the relay.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
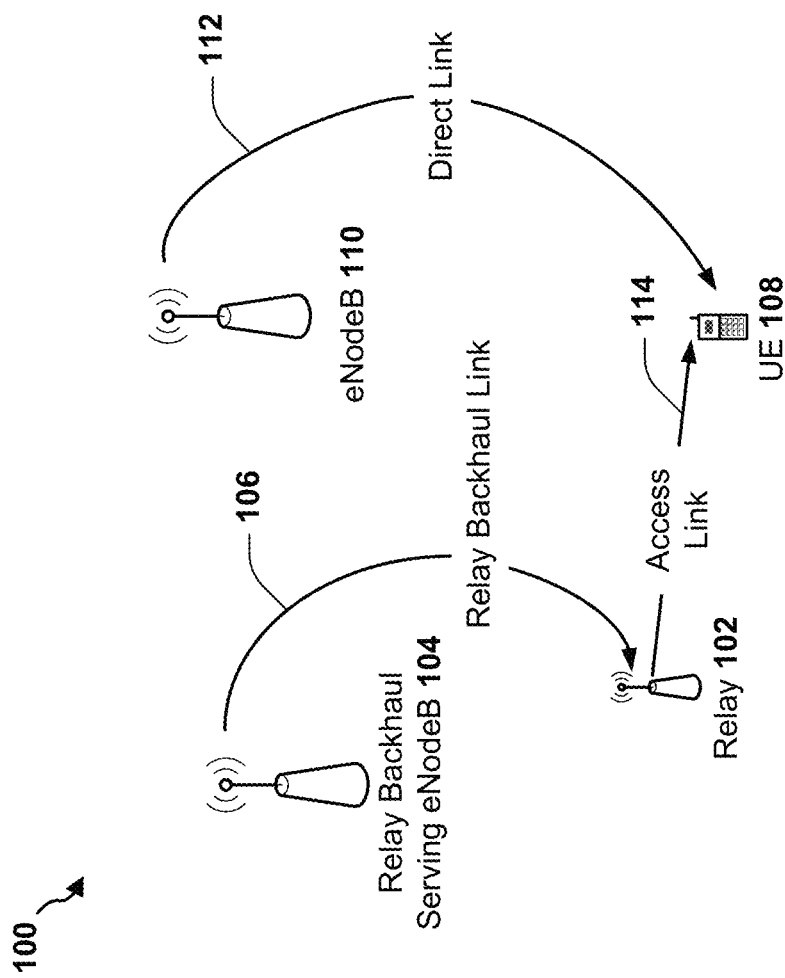
FIG. 1 illustrates a wireless communication system for associating an user equipment (UE) with a relay.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to associating user equipment (UE) in a wireless network with a relay for providing wireless network access thereto. In one example, various metrics of the relay may be measured or otherwise approximated for determining whether a UE should be associated with a relay. Relay metrics may include, for example, a backhaul link quality of the relay, an access link path loss to the relay, a relay state and loading, etc., and/or additional metrics, such as a direct link quality between the UE and a base station, e.g., a serving evolved Node B (eNB). In one example, one or more relays may be determined to have a backhaul geometry, e.g., a link quality with a serving eNB of the relay, that is at least a threshold greater than a direct geometry of a UE, e.g., a link quality with a serving eNB of the UE. Of these relays, the ones with an access link path loss less than a threshold may be considered for association with the UE. In one example, of those relays considered for association, the relay with the best backhaul geometry may be chosen for association to the UE. In another example, the relay, of those considered for association, with a backhaul geometry within a threshold difference of the relay with the best backhaul geometry may be selected for association to the UE. In another example, relays may be sorted in a list based on the above metrics, and a relay from the list may be selected for association to the UE based on one or more threshold comparisons. In any case, the additional considerations of the association algorithm may lead to improved association results over current schemes that consider only received signal power or path loss. For example, the described association functions may avoid selecting relays that potentially cause interference to non-served UEs, while attempting to select relays that still provide reasonably good backhaul link quality.

As used in this application, the terms "component," "module," "system" and the like are intended to include a computer-related entity, such as but not limited to hardware, firmware, a combination of hardware and software/firmware, software/firmware, or software/firmware in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a smart phone, a netbook, a smartbook, an ultrabook, a handheld device having wireless connection capability, a laptop, a tablet, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) (including LTE-Advanced, or LTE-A) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, a wireless communication system 100 is illustrated that facilitates associating a UE with a relay to receive wireless network access. System 100 includes a relay 102 that is served by a relay backhaul serving eNB 104 over a relay backhaul link 106. For example, the relay 102 receives signals from the relay backhaul serving eNB 104 over the relay backhaul link 106 and accordingly relays, e.g., retransmits, the signals for improved hearability at one or more UEs associated with relay 102. The relay backhaul serving eNB 104 may be a macrocell, picocell, femtocell, or similar eNB, and/or substantially any component for which the relay 102 can retransmit communications. In addition, the relay backhaul link 106 can be a wired or wireless, e.g., over-the-air, link between relay backhaul serving eNB 104 and relay 102.

System 100 also includes a UE 108 that may be served by an eNB 110 over a direct link 112 thereto. Similar to the relay backhaul serving eNB 104, eNB 110 may be a macrocell, picocell, femtocell, or similar eNB, a device communicating in peer-to-peer or ad-hoc mode with UE 108, and/or the like, that can provide access to a wireless network. UE 108 may be a wireless terminal, a modem (or other tethered device), or substantially any device that can receive wireless network access from eNB 110. The direct link may be a wired or wireless link that facilitates communication between eNB 110 and UE 108. The eNB 110 may associate UE 108 with a relay based on one or more parameters, as described herein. Where eNB 110 elects to associate UE 108 with relay 102, for example, relay 102 can communicate with UE 108 over an access link 114, which can similarly be a wired or wireless link that facilitates communication between relay 102 and UE 108.

The association algorithms described herein use link qualities of the aforementioned direct, backhaul and access links. For the direct and backhaul links, link geometries serve as the metric and for the access link path loss (PL) serves as the metric. Other suitable link metrics may be used. The association algorithms may also benefit from knowledge of the active/inactive state of the relays and the loading of the eNBs and relays. In summary, the association algorithms work with the following metrics: direct link quality, backhaul link quality, access link, relay state and loading, e.g., the ON or OFF state of the relays and the loading metrics, which may be as detailed as resource utilization or as coarse as the number of UEs camped onto the relay. These metrics help the association algorithm to select a suitable relay or eNB for a given UE. The absence of one or more metrics (due to lack of procedures to obtain such metrics) can result in use of suitable approximate metrics, for example, instead of geometric difference in PL to serving cell, a strongest interfering cell could be used. In some cases, the backhaul geometry might not be signaled. In such cases, implicit values of backhaul geometrics can be inferred. The association algorithm can be implemented in any entity that has access to the aforementioned metrics. It association algorithm can be implemented in the UE, eNB network, relay network, or distributed among these nodes.

According to an example, an eNB 110 can determine whether to associate a UE 108 with a relay 102 and/or one or more other relays based at least on geometries or other quality measurements of the various links or potential links (e.g., relay backhaul link 106, direct link 112, and/or access link 114). Though generally referred to herein as link quality, it is to be appreciated that concepts described herein can utilize substantially any measure of link geometry, such as received signal power, rise-over-thermal (RoT), path loss, signal-to-noise ratio (SNR), and/or the like. In addition, the link qualities may be measured, received from a related component, approximated based on other considerations, and/or the like.

In an example, in determining whether to associate the UE 108 with a relay, the eNB 110 may obtain relay backhaul link qualities of one or more relays, such as relay backhaul link 106 quality at relay 102. This may include receiving the backhaul link quality over a backhaul link with the corresponding relay, e.g., relay 102, with the relay backhaul serving eNB, e.g., eNB 104, and/or the like. In one example, eNB 110 may serve one or more relays considered for association to UE 108, and would thus know the relay backhaul link quality associated with the one or more relays.

In another example, in cases where the backhaul geometry information cannot be signaled to the eNB, the eNB 110 can infer the relay backhaul link quality based on whether the associated relay is operating in the wireless network, e.g., is the relay in an ON or OFF state. For example, the relay 102 can advertise services where its relay backhaul link 106 quality is at least a threshold quality. In this example, the eNB 110 can infer at least a worst case relay backhaul link 106 quality for the relay 102 based on determining that the relay 102 is communicating in the wireless network. For example, in one example, the UE 108 can report the relay 102 to the eNB 110 as a possible candidate for association, e.g., in a measurement report. Based on this indication, the eNB 110 can determine that the relay 102 is communicating in the network, and assume a worst case relay backhaul link 106 quality for the relay. In another example, the relay 102 can advertise its backhaul link 106 quality, and the UE 108 can determine the backhaul link 106 quality and notify the eNB 110.

The eNB 110 can determine the direct link 112 quality based on control information received from the UE 108 communicating with the eNB 110. Similarly, the UE 108 can report an access link 114 quality, e.g., as a path loss from the UE to the relay 102, to the eNB 110. This quality report may be part of a measurement report or other indication provided by the UE.

In one example, eNB 110 can determine a set of relays that are feasible for UE 108 association. The eNB 110 may define and generate this set of feasible relays based in part on determining relays having corresponding relay backhaul link qualities that are different from the direct link quality 112 by at least a threshold (e.g., where the relay backhaul link quality is greater than the direct link 112 quality). Thus, the eNB 110, in this example, may determine whether relay backhaul link 106 quality is different from the direct link 112 quality by at least the threshold, and if so, can include the relay 102 in the set of feasible relays for associating to the UE 108. The eNB 110 may also consider whether a path loss over the potential access link to the relay (e.g., the path loss of access link 114 for relay 102) achieves a threshold path loss to determine whether the relay should be in the set of feasible relays.

Figure 2:
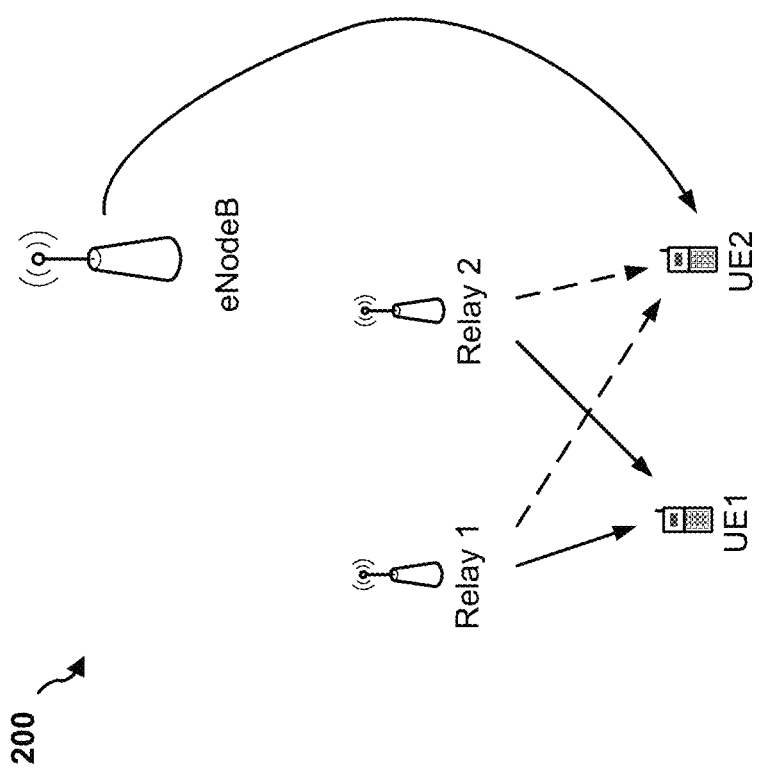
FIG. 2 illustrates a wireless communication system with access interference.

If there are no feasible relays, in an example, eNB 110 can continue serving UE 108 without relay association. In one example, given a set of feasible relays, eNB 110 can select a relay with the best backhaul link quality to associate to UE 108. In one example, this can include relay 102, and associating the relay to UE 108 can include communicating with the relay 102 to request or instruct relay 102 to serve UE 108.

Where there is a plurality of relays with similarly strong backhaul link qualities, however, the chosen relay may interfere with one or more of the plurality of relays. This interference is referred to as access interference and is illustrated in FIG. 2, which shows a wireless communications system 200 having two relays, Relay 1 and 2, and two UEs, UE 1 and UE 2. Assume that UE1 is served by Relay 1 and UE2 is served by a macro (or micro) eNodeB. Then the eNodeB decides to off-load UE2 to the relay network. Using the association schemes based on only backhaul geometry metric and access path loss, the eNB could potentially offload the UE2 to Relay 2 (shown by dashed line in FIG. 2). However, this could cause access interference (an X-channel), where Relay 1 interferes with Relay 2, and vice-versa. The methods described above, which are based on only backhaul geometry and access PL to the serving relay, may be insufficient to handle the access interference issue.

Thus, to address the access interference issue, in another example, given the set of feasible relays, eNB 110 can determine the relay with the best backhaul link quality, but can associate UE 108 with a relay having a reasonable backhaul link quality as compared to the relay with the best backhaul link quality. For example, this can include selecting the relay with a backhaul quality that differs from the best backhaul link quality by no more than a threshold quality. Thus, the UE 108 avoids selecting the relay with the best backhaul quality, selection of which could cause interference to other relays, as described.

In yet another example, eNB 110 can consider possible relay access link interference in selecting a relay for associating to UE 108, which can include consideration of additional parameters or comparisons thereof. For example, eNB 110 can additionally obtain information regarding whether a given relay is serving UEs and/or a number of UEs served, which can be received over a backhaul link with the relays or corresponding serving eNB, etc. In this example, eNB 110 can determine a set of relays visible to UE 108. Visible relays include relays having an access link path loss from the UE 108 that is less than a threshold. The set of visible relays can be sorted based on one or more considerations, such as relay backhaul link quality. If relays have identical backhaul link quality (e.g., especially in the case where the backhaul link quality is assumed to be a worst case quality), ordering can be determined based on considerations such as the number of UEs served by the relays, access link path loss to the relays, a random determination algorithm, and/or the like.

Based on the ordered set of visible relays, the eNB 110 can select a first relay that meets certain comparisons as the relay for associating to UE 108. For example, the comparisons can include a first metric to a first threshold, wherein the first metric is based on the path loss from the UE to a first relay and a second path loss from the UE to a second relay; a second metric to a second threshold, wherein the second parameter is based on the path loss from the UE to a first relay and a third path loss from the relay to another UE served by another relay; a third metric to a third threshold, wherein the third metric is based on a relay path loss from the relay to another relay; and a fourth metric to the direct link quality, wherein the fourth metric is based on the relay backhaul link quality and a fourth threshold. Based on the comparisons and various threshold values, the eNB 110 can select a relay for associating with UE 108 that does not cause undue interference to other relays, UEs served by other relays, and/or the like.

Though described above and herein as occurring in the eNB 110, it is to be appreciated that the association algorithms described can be performed at substantially any node in a wireless network, e.g., UE, relay, core network components, such as a gateway, etc., and/or distributed across a plurality of such nodes.

Figure 3:
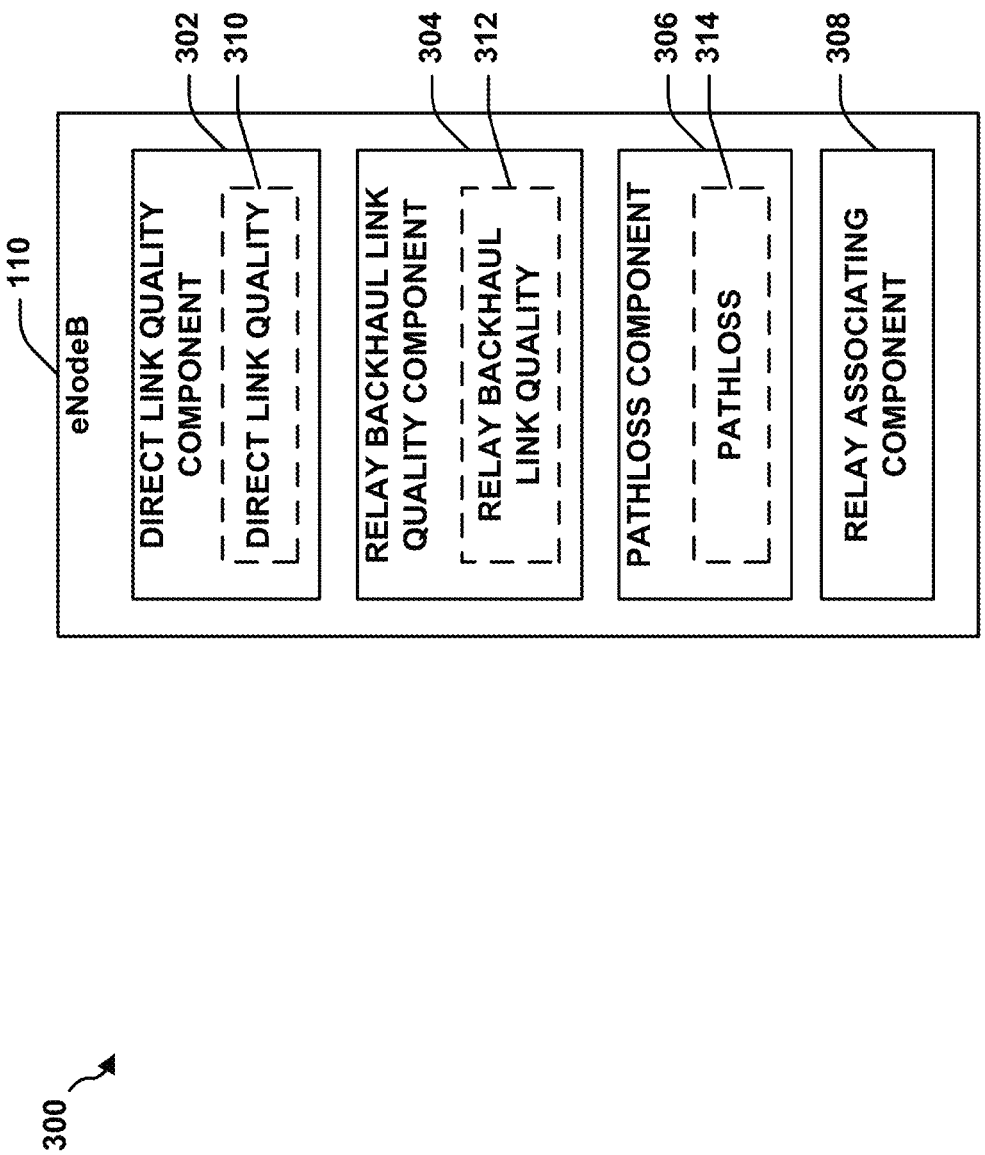
FIG. 3 illustrates an apparatus, e.g., an eNB, that associates UEs with relays based on link quality metrics and path loss measurements.

Turning now to FIG. 3, system 300 illustrates an example of the eNB 110 in accordance with aspects described herein. The eNB 110 includes a direct link quality component 302 for obtaining one or more quality metrics or other measures of geometry of the direct link from the eNB 110 to one or more UEs, such as UE 108. The eNB also includes a relay backhaul link quality component 304 for measuring, receiving, or otherwise approximating one or more quality metrics or other measures of geometry of a backhaul link from one or more relays to associated serving eNBs. The eNB 110 also includes a path loss component 306 for receiving or otherwise measuring path loss between a UE and one or more relays, and a relay associating component 308 for determining whether to associate a UE to a relay based in part on one or more of the quality or path loss metrics.

According to an example, the direct link quality component 302 can obtain a direct link quality 310 of a direct link between the eNB 110 and a related UE based on control information from the UE, a determined throughput of data to/from the UE, and/or the like.

The relay backhaul link quality component 304 can determine relay backhaul link quality 312 for one or more relays in part by receiving an indication of the backhaul link quality from the relay, e.g., over a backhaul link to the serving eNB thereof, approximating the backhaul link quality of the relay based on one or more parameters, and/or the like, as described. In one example, the relay backhaul link quality component 304 can approximate a relay backhaul link quality 312 of one or more relays as a worst case relay backhaul link quality where the relay backhaul link quality component 304 determines the relay is in an on state. In this example, the worst case relay backhaul link quality can be a threshold quality required for the relay to operate in the on state. The relay backhaul link quality component 304 can infer the relay is in the on state based on receiving an indication from the UE that the relay is operating in the network, e.g., in a measurement report, as described above. In one example, the relay backhaul link quality component 304 can determine the relay backhaul link quality 312 as the worst case backhaul link quality where no other backhaul link quality is received, e.g., from the relay or its associated serving eNB, or otherwise measured. In another example, the eNB 110 can serve the relay, and the relay backhaul link quality component 304 thus determines the relay backhaul link quality 312 of the relay based on one or more measurements of the backhaul link, control information received from the relay and/or the like.

The path loss component 306 can determine a path loss 314 between the UE and one or more of the relays. In one example, the path loss component 306 can determine the path loss based on a report from the UE, e.g., a measurement report, as previously described. In one example, the path loss component 306 can determine the path loss only for relays that have at least a threshold relay backhaul link quality 312, e.g., as compared to the direct link quality 310 or otherwise independent thereof.

The relay associating component 308 can determine whether to associate a relay with a UE based on one or more of the direct link quality 310, the relay backhaul link quality 312, or the path loss 314, as previously described. In one example, the relay associating component 308 can determine a set of feasible relays for associating to a UE. As previously described, the relay associating component 308 can determine the set of relays as those having a relay backhaul link quality 312 at least a threshold difference from the direct link quality 310, e.g., relay backhaul link quality 312 greater than direct link quality 310. In addition, the relay associating component 308 can further determine the set of feasible relays based on whether a path loss 314 from the UE to a given relay is less than a threshold. If there are no feasible relays, eNB 110 can continue serving the UE.

A described above, given the set of feasible relays, the relay associating component 308 can select a relay with the best relay backhaul link quality 312 and/or a relay with a relay backhaul link quality 312 that is at most a threshold quality poorer than the relay with the best relay backhaul link quality for association to the UE. This can mitigate interference that may be caused by selecting the relay with the best relay backhaul link quality 312, as previously described. In another example, the relay associating component 308 can generate a set of visible relays that have path loss 314 with the UE that is less than a threshold. The relay associating component 308 can determine whether a relay is active based in part on receiving an indication of such and/or a number of UEs supported by the relay over a backhaul link to a serving eNB of the relay or another component, receiving an indication of communicating with the relay from a UE, a recent handover of a UE from eNB 110 to the relay, and/or the like.

Upon determining the set of visible relays, relay associating component 308 can order the set based on the following criteria, in one example, where a relay with a greater backhaul quality is considered higher in the order. If two relays have identical or substantially similar backhaul link quality, then the relay that is active, e.g., serving at least one UE, is considered higher in the order. If both the relays are active then the relay with lesser number of UEs associated to it is deemed higher in order. If the relays are still tied or are inactive, the relay with a lower access link path loss 314 is deemed higher in order. If the relays are still tied, e.g., same or similar backhaul quality, same activity status, same or similar number of UEs associated to them, same or similar path loss, etc., one of the relays can be deemed higher in the order according to a random function.

Based on the generated ordered list of relays, relay associating component 308 can select a relay for associating the UE based on one or more additional determinations. For example, the relay associating component 308 can associate the UE to the top-most candidate relay in the ordered list that satisfies the following comparisons:

$$\frac{\text{access path loss}(PL)\text{from the given } UE \text{ to this candidate relay}}{\text{access } PL \text{ from the given } UE \text{ to a neighboring ACTIVE relay}} > threshold_1$$

-continued $$\frac{\text{access } PL \text{ from this candidate relay to the given } UE}{\text{access } PL \text{ from this candidate relay to another } UE \text{ served by another relay}} > threshold_2$$

$$PL \text{ from the candidate relay to another relay which is ACTIVE} > threshold_3$$

$$Backhaullink \text{ Geometry} - threshold_4 > Directlink \text{ geometry}$$

If no such candidate visible relay exists, then the relay associating component 308 can retain association of the UE to eNB 110. In one example, the thresholds above can be tuned to reduce access link interference. For example, to avoid range expansion, relay associating component 308 can set $threshold_1=0$ and $threshold_2=0$. Moreover, for example, relay associating component 308 can choose $threshold_3$ to ensure that nearby relays are not active, which might potentially cause interference with UE mobility. Relay associating component 308 can set $threshold_4$ as an offloading parameter to offload the UE to a relay, e.g., whose backhaul is not as good as the direct link of the UE. For example, this can be used to obtain cell-splitting gains.

Figure 4:
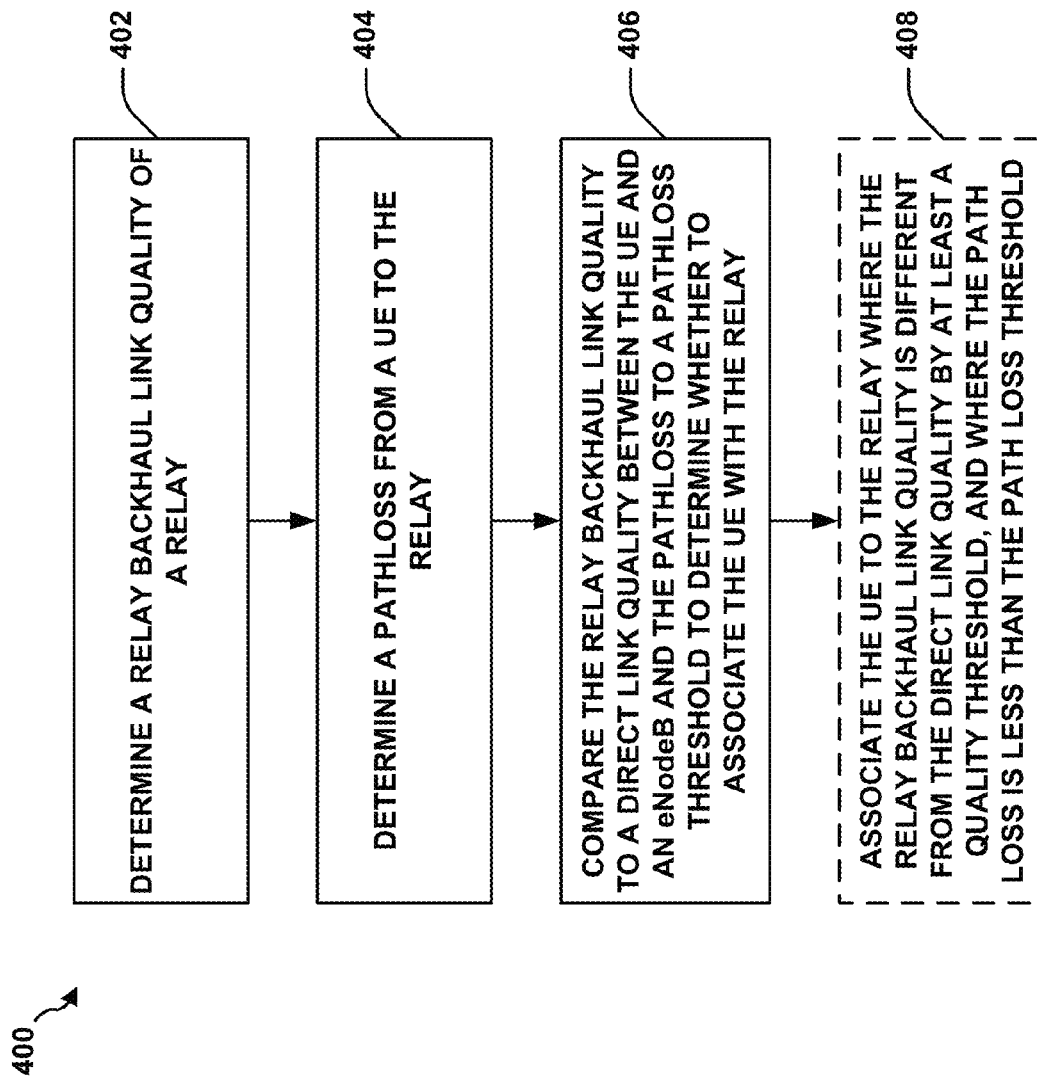
FIG. 4 illustrates a methodology for determining whether to associate a UE with a relay.
Figure 5:
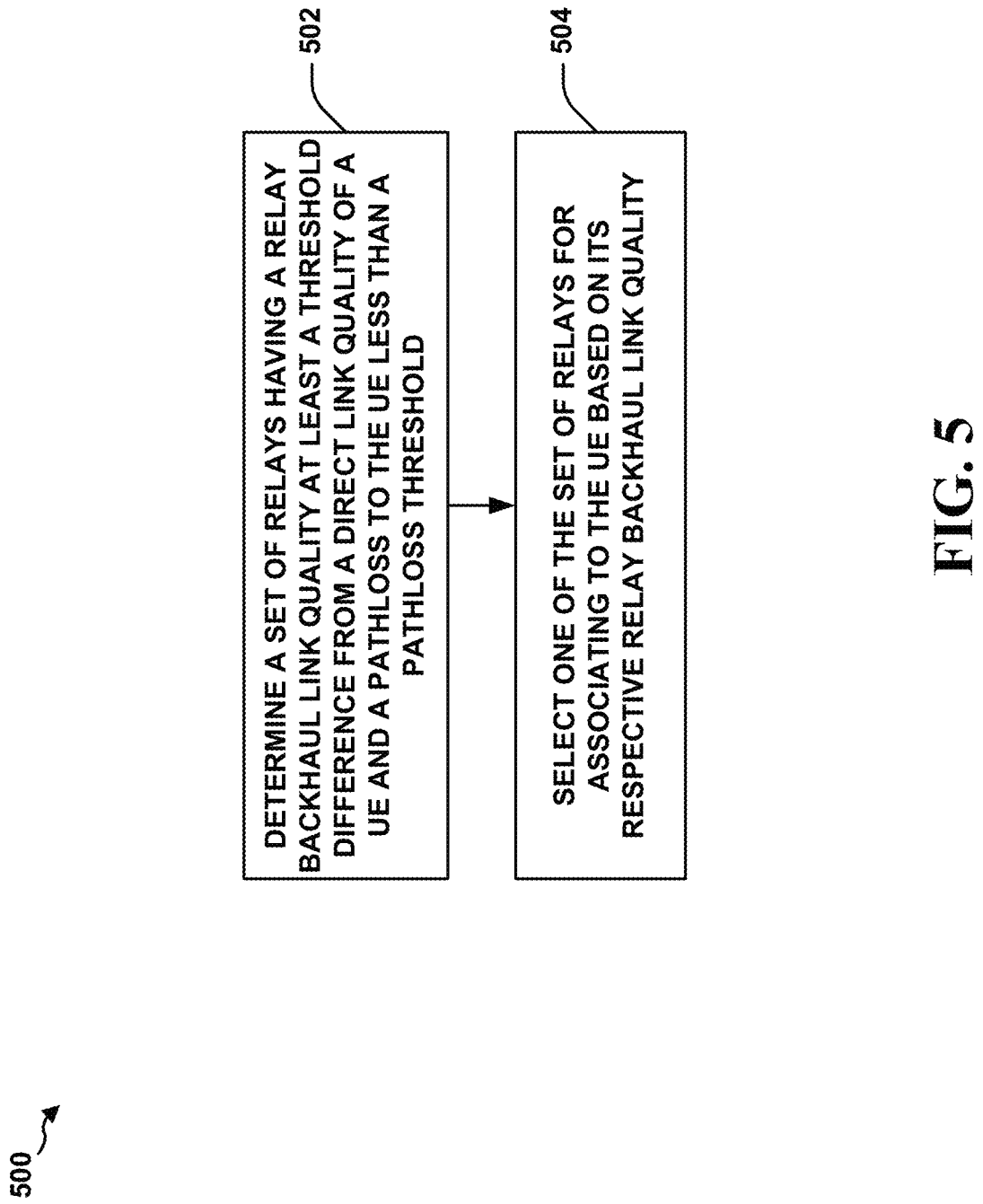
FIG. 5 illustrates a methodology for selecting a relay from a set of relays with which to associate a UE.
Figure 6:
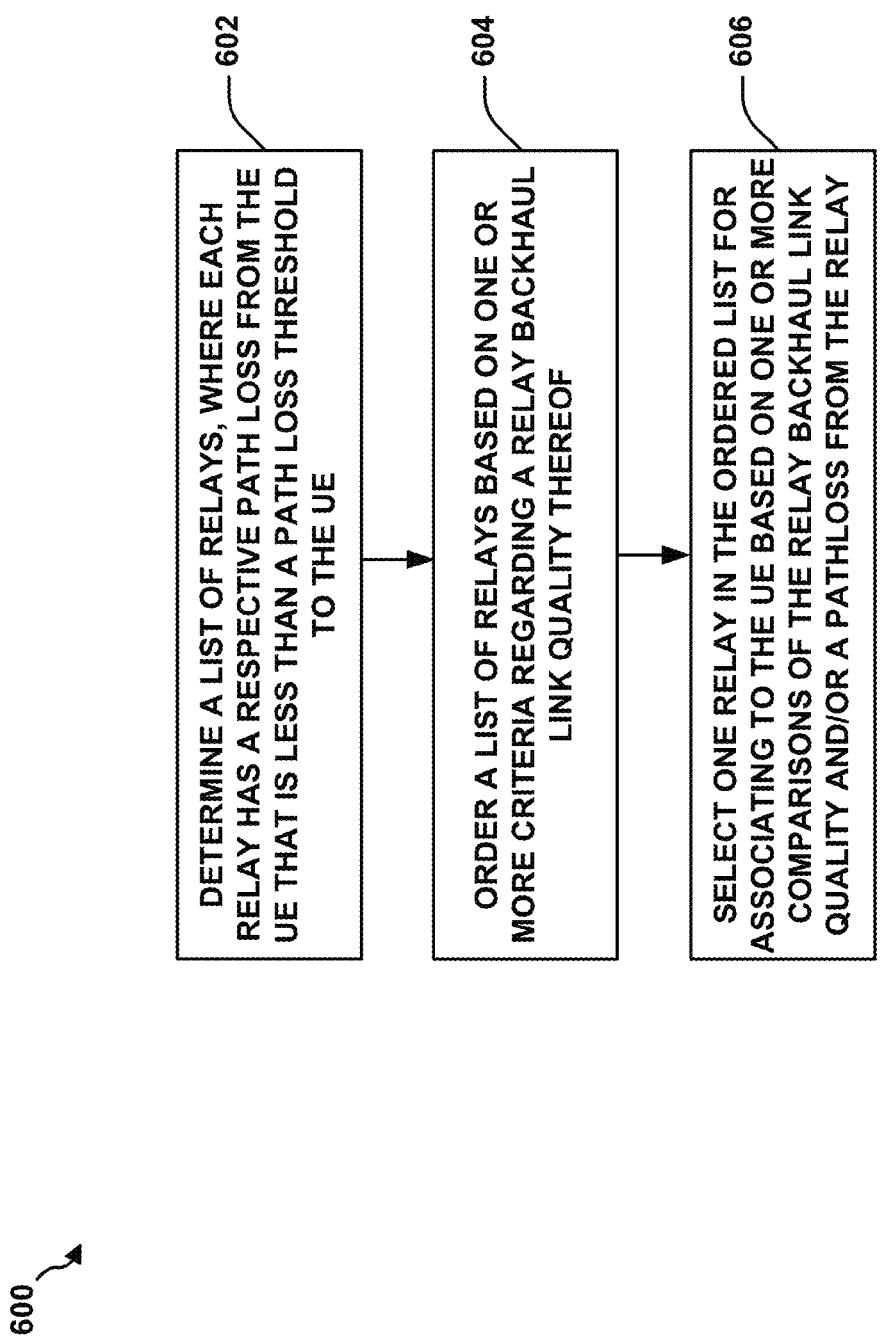
FIG. 6 illustrates a methodology for selecting a relay from an ordered list of relays with which to associate a UE.

Referring to FIGS. 4-6, example methodologies for associating relays to UEs are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 4, an example methodology 400 that facilitates associating a UE to a relay based on a relay backhaul link quality, direct link quality, and path loss to the relay is illustrated. At step 402, a relay backhaul link quality of a relay can be determined. This can include receiving the relay backhaul link quality from the relay and/or from an eNB serving the relay, receiving the relay backhaul link quality from a device communicating with the relay, approximating the relay backhaul link quality based on one or more parameters of the relay, etc. In one example, determining the relay backhaul link quality at step 402 may be based on a worst case relay backhaul link quality required for the relay to operate in the wireless network. In this example, an indication that the relay is operating in the wireless network can be received, and the worst case relay backhaul link quality can be determined for the relay at step 402.

At step 404, a path loss from a UE to the relay can be determined. For example, this can include receiving the path loss in a measurement report or other indication from the UE, receiving the path loss in an indication from the relay, e.g., via a backhaul link to its serving eNB, and/or the like.

At step 406, the relay backhaul link quality can be compared to a direct link quality between the UE and an eNB and the path loss can be compared to a path loss threshold to determine whether to associate the UE with the relay. As described above, this can include determining whether the difference between the relay backhaul link quality and the direct link quality is at least a quality threshold and determining whether the path loss is less than a path loss threshold.

If so, at step 408, the UE can optionally be associated to the relay where the relay backhaul link quality is at least a quality threshold difference from the direct link quality and where the path loss is less than the path loss threshold. For example, associating the UE to the relay at step 408 can also be based on determining that the relay backhaul link quality of the relay is the best relay backhaul link quality out of a set of relays, no more than a threshold quality worse than the best relay backhaul link quality, etc., as described above.

In other examples, a list of relays can be created based on respective path losses, and the list can be ordered based on one or more criteria. In this example, a relay for associating with the UE at step 408 can be selected from the list based on one or more comparisons, as described above.

Turning to FIG. 5, an example methodology 500 is shown for selecting a relay from a set of relays for associating to a UE. At step 502, a set of relays having a respective relay backhaul link quality that is different from a direct link quality of a UE by at least a threshold, and a respective path loss to the UE that is less than a path loss threshold can be determined. For example, the set can be determined based in part on comparing the link qualities and path losses as received from the relays, UEs, etc., or otherwise approximated based on other parameters, as previously described.

At step 504, one relay out of the set of relays can be selected for associating to the UE based on its respective relay backhaul link quality. As described, this can include comparing the relay backhaul link quality to those of other relays and determining the relay backhaul link quality of the selected relay is the best. In another example, this can include selecting a relay with a relay backhaul link quality that is no more than a threshold worse than the best relay backhaul link quality to mitigate potential interference caused by selecting the relay with the best relay backhaul link quality.

In FIG. 6, an example methodology 600 is shown for selecting a relay from an ordered list of relays for associating to a UE. At step 602, a list of relays is determined, where each relay has a respective path loss from the UE that is less than a path loss threshold to the UE. A step 604, the list of determined relays is ordered based on one or more criteria regarding a relay backhaul link quality thereof. The one or more criteria, as described above, can include comparing the relay backhaul link quality with that of other relays in the list. The list can also be ordered based on a number of UEs served by the relays, the access link path loss from the relays to the UE, and/or the like.

At step 606, one relay in the ordered list is selected for associating to the UE based on one or more comparisons of the relay backhaul link quality and/or a path loss from the relay. As described above, the comparisons can include comparing metrics or parameters to a plurality of thresholds that can be defined for different purposes, e.g., to avoid range expansion, to mitigate interference with UE mobility, to offload the UE, etc.

It will be appreciated that, in accordance with one or more aspects described herein, inferences can be made regarding determining a relay backhaul link quality, determining thresholds for selecting a relay from an ordered list of relays for association to a UE, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
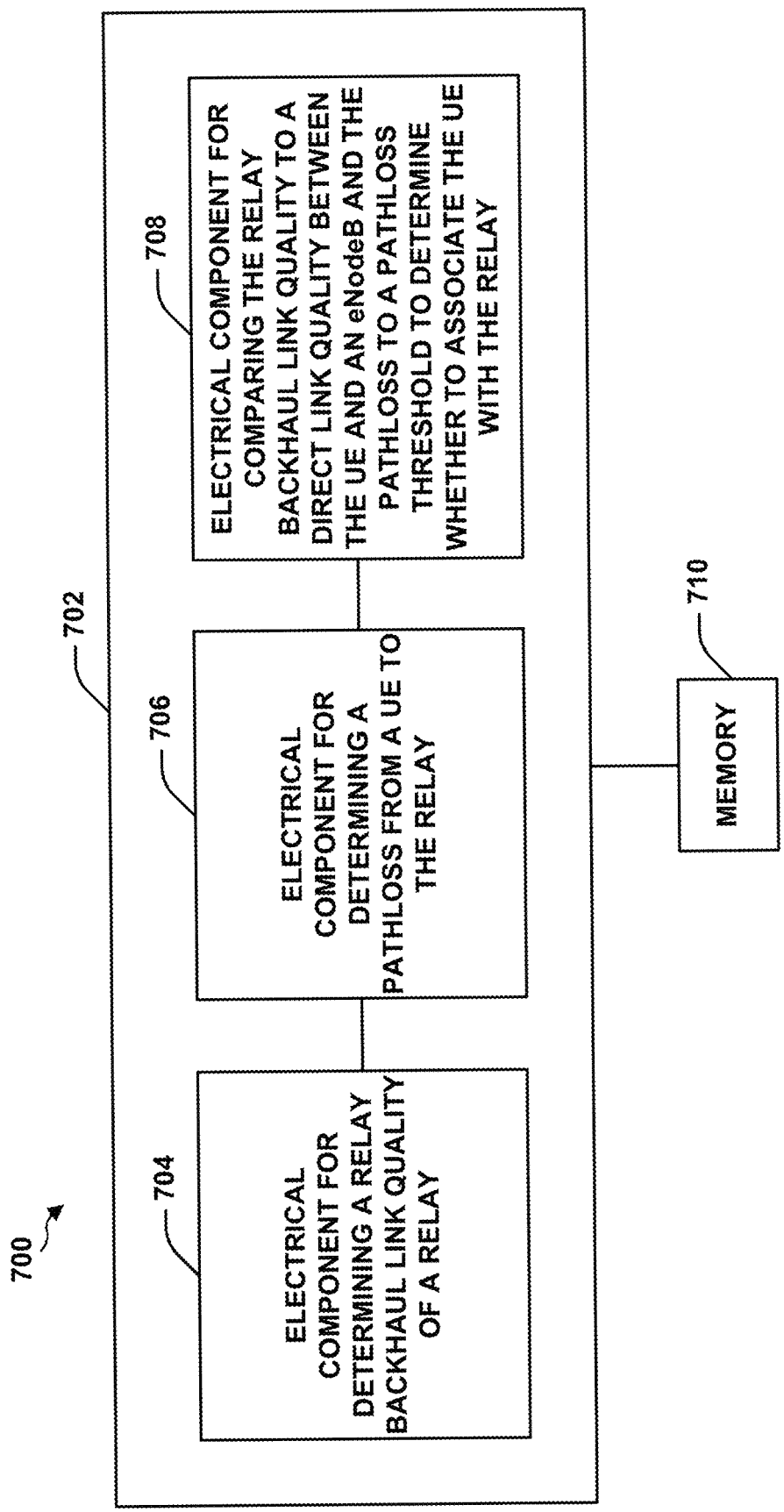
FIG. 7 illustrates an apparatus that determines whether to associate a UE with a relay.

Turning now to FIG. 7, an apparatus 700 for determining whether to associate a UE to a relay is illustrated. The apparatus 700 is configured to implement one or more of the methods of the flow charts of FIGS. 4-6, and may reside entirely or at least partially within an eNB or other device for determining association. It is to be appreciated that apparatus 700 is represented as including functional blocks, which can be functional blocks that represent functions implemented by a processor, software/firmware, or combination thereof. The apparatus 700 includes a logical grouping 702 of components (e.g., electrical components) that can act in conjunction. For instance, logical grouping 702 can include an electrical component for determining a relay backhaul link quality of a relay (704). As described, this can include measuring, receiving, or otherwise approximating the backhaul link quality for the relay.

Moreover, logical grouping 702 can include an electrical component for determining a path loss from a UE to the relay (706). Logical grouping 702 can also include an electrical component for comparing the relay backhaul link quality to a direct link quality between the UE and an eNB and the path loss to a path loss threshold to determine whether to associate the UE with the relay (708). In one example, electrical component 708 can compare such to determine a set of relays and select a relay from the set based on the relay backhaul link quality or one or more other comparisons or determinations based on such.

The electrical component 704 may comprise a relay backhaul link quality component 304, the electrical component 706 may comprise a path loss component 306, the electrical component 708 may comprise a relay associating component 308, etc., in one example. Additionally, apparatus 700 can include a memory 710 that retains instructions for executing functions associated with the electrical components 704, 706, and 708, stores data used or obtained by the electrical components 704, 706, 708, etc. While shown as being external to memory 710, it is to be understood that one or more of the electrical components 704, 706, and 708 can exist within memory 710. In one example, electrical components 704, 706, and 708 can comprise at least one processor, or each electrical component 704, 706, and 708 can be a corresponding module of at least one processor. Moreover, in an additional or alternative example, components 704, 706, and 708 can be a computer program product including a computer readable medium, where each component 704, 706, and 708 can be corresponding code.

Figure 8:
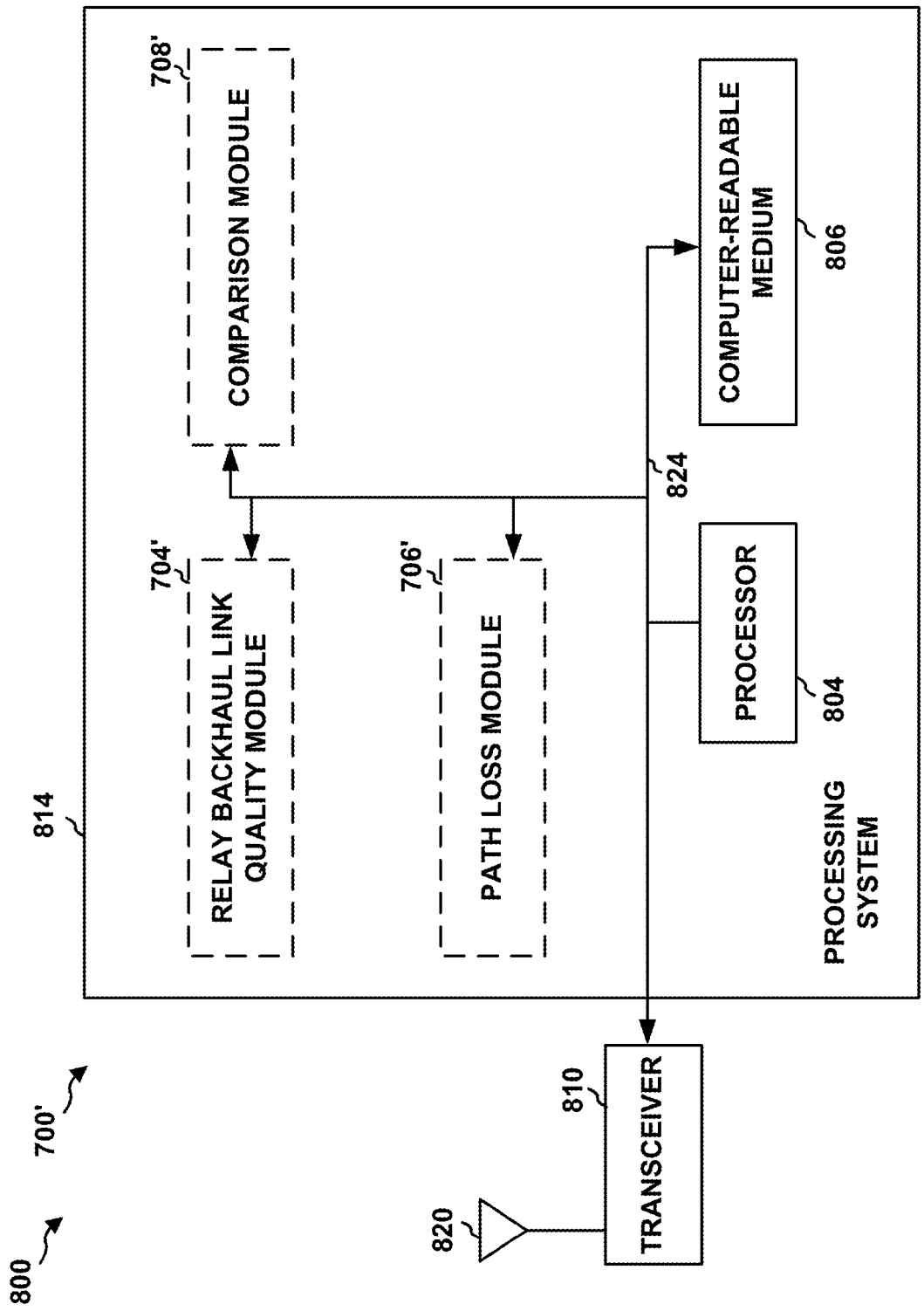
FIG. 8 illustrates an apparatus employing a processing system to determine whether to associate a UE with a relay.

FIG. 8 is a diagram 800 illustrating an example of a hardware implementation for an apparatus 700' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the relay backhaul link quality module 704', the path loss module 706', the comparison module 708', and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814. In addition, the transceiver 810 receives information from the processing system 814, and based on the received information, generates a signal to be applied to the one or more antennas 820. The processing system 814 includes a processor 804 coupled to a computer-readable medium 806. The processor 804 is responsible for general processing, including the execution of software/firmware stored on the computer-readable medium 806. The software/firmware, when executed by the processor 804, causes the processing system 814 to perform the various functions described supra for any particular apparatus. The computer-readable medium 806 may also be used for storing data that is manipulated by the processor 804 when executing software/firmware. The processing system further includes at least one of the modules 704', 706', and 708'. The modules may be software modules running in the processor 804, resident/stored in the computer readable medium 806, one or more hardware modules coupled to the processor 804, or some combination thereof.

In one configuration, the apparatus 700/700' for wireless communication includes means for determining a relay backhaul link quality of a relay, means for determining a path loss from a UE to the relay, and means for comparing the relay backhaul link quality to a direct link quality between the UE and a base station, and the path loss to a path loss threshold to determine whether to associate the UE with the relay. The apparatus 700/700' may further include means for associating the UE with the relay when the relay backhaul link quality is different from the direct link quality by at least a quality threshold and the path loss is less than the path loss threshold. The aforementioned means may be one or more of the aforementioned components/modules of the apparatus 700 and/or the processing system 814 of the apparatus 700' configured to perform the functions recited by the aforementioned means.

Figure 9:
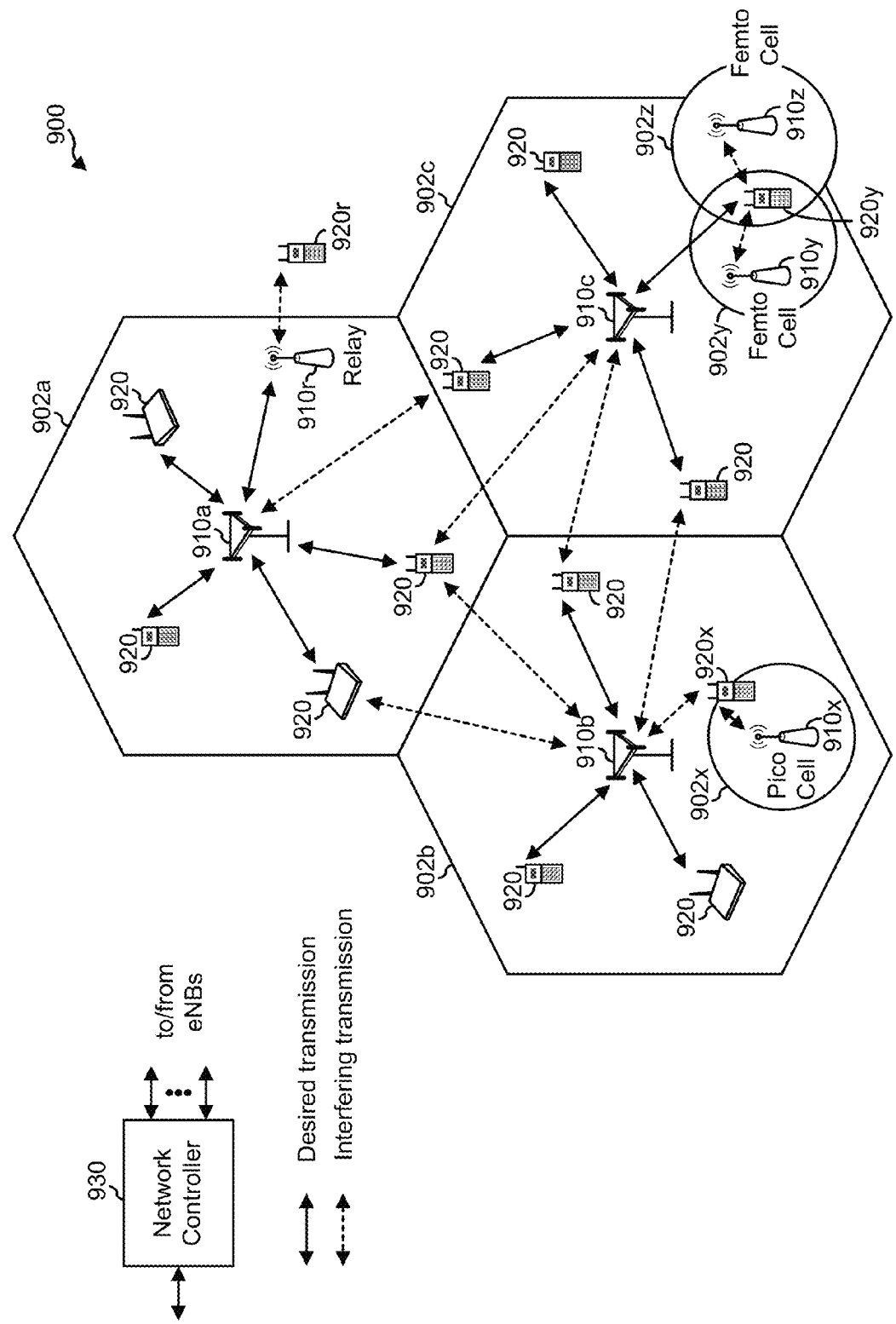
FIG. 9 illustrates a multiple access wireless communication system according to one embodiment.

FIG. 9 shows a wireless communication network 900, which may be an LTE network. The wireless network 900 may include a number of evolved Node Bs (eNBs) 910 and other network entities. An eNB may be a station that communicates with the UEs and may also be referred to as a base station, a Node B, an access point, etc. Each eNB 910 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 9, the eNBs 910a, 910b and 910c may be macro eNBs for the macro cells 902a, 902b and 902c, respectively. The eNB 910x may be a pico eNB for a pico cell 902x. The eNBs 910y and 910z may be femto eNBs for the femto cells 902y and 902z, respectively. An eNB may support one or multiple (e.g., three) cells.

The wireless network 900 may also include relay stations. A relay station can receive a transmission of data and/or other information from an upstream station (e.g., an eNB or a UE) and send a transmission of the data and/or other information to a downstream station (e.g., a UE or an eNB). A relay station may also be a UE that relays transmissions for other UEs. In the example shown in FIG. 9, a relay station 910r may communicate with the eNB 910a and a UE 920r in order to facilitate communication between the eNB 910a and the UE 920r. A relay station may also be referred to as a relay eNB, a relay, etc.

The wireless network 900 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 900. For example, macro eNBs may have a high transmit power level (e.g., 20 Watts) whereas pico eNBs, femto eNBs and relays may have a lower transmit power level (e.g., 1 Watt).

The wireless network 900 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 930 may couple to a set of eNBs and provide coordination and control for these eNBs. The network controller 930 may communicate with the eNBs 910 via a backhaul. The eNBs 910 may also communicate with one another, e.g., directly or indirectly via wireless or wireline backhaul.

The UEs 920 (e.g., 920x, 920y) may be dispersed throughout the wireless network 900, and each UE may be stationary or mobile. A UE may also be referred to as a device, a terminal, a mobile station, a subscriber unit, a station, etc. A UE may be a cellular phone, a personal digital assistant (PDA), a wireless modem (or other tethered device), a wireless communication device, a handheld device, a laptop computer, a tablet, a smart phone, a netbook, a smartbook, an ultrabook, a cordless phone, a wireless local loop (WLL) station, etc. A UE may be able to communicate with macro eNBs, pico eNBs, femto eNBs, relays, etc. In FIG. 9, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. Moreover, eNBs 910 can provide functionality to attempt to associate UE 920r with a relay 910r, as described above.

Figure 10:
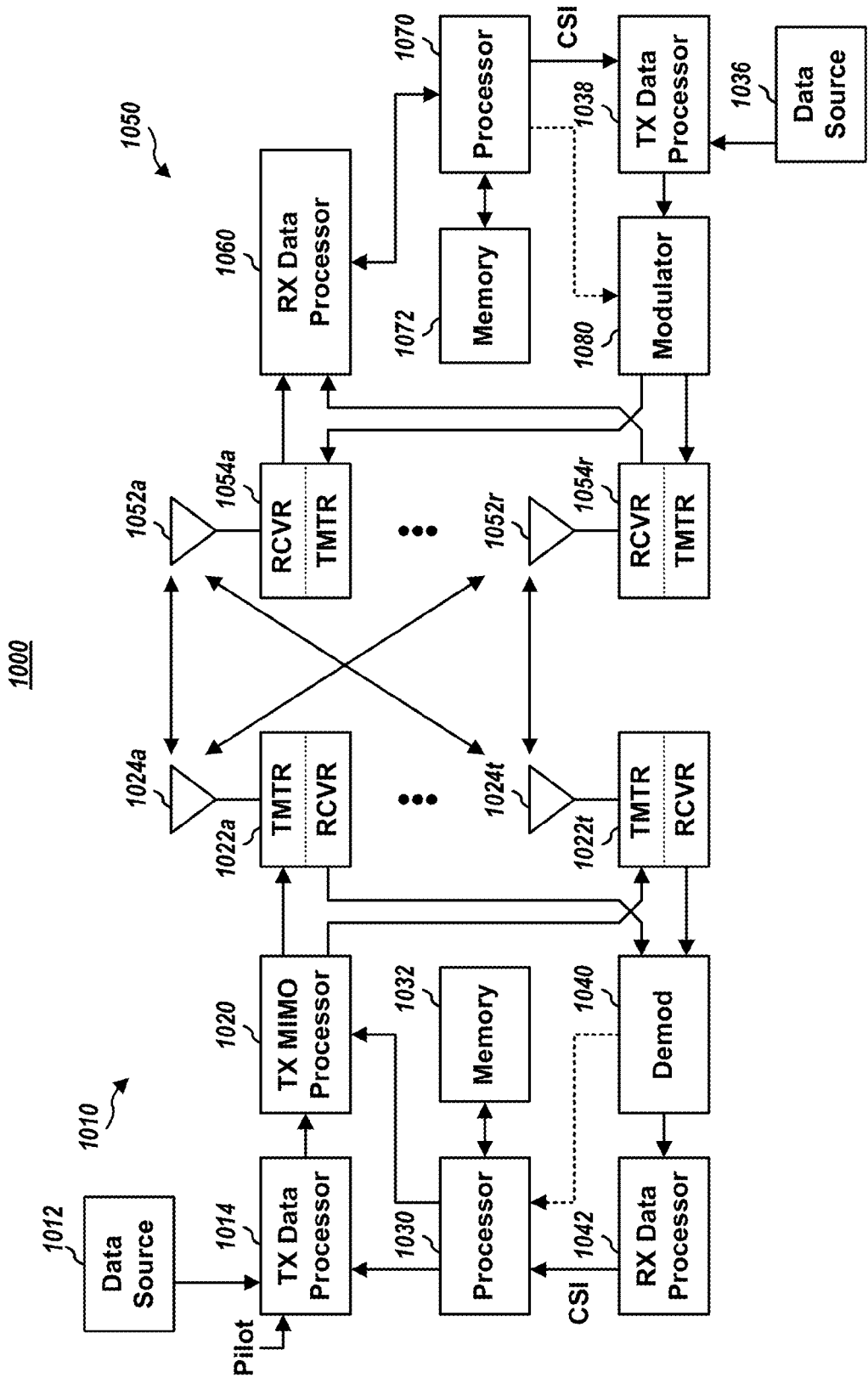
FIG. 10 illustrates a block diagram of a wireless communication system.

FIG. 10 is a block diagram of an embodiment of a transmitter system 1010 (also known as, e.g., access point) and a receiver system 1050 (also known as, e.g., access terminal) in a MIMO system 1000. At the transmitter system 1010, traffic data for a number of data streams is provided from a data source 1012 to a transmit (TX) data processor 1014. In addition, it is to be appreciated that transmitter system 1010 and/or receiver system 1050 can employ the systems (e.g., FIGS. 1, 2, 3, 7, 8, 9) and/or methods (e.g., FIGS. 4, 5, 6) described herein to facilitate wireless communication there between. For example, components/modules or functions of the systems and/or methods described herein can be part of a memory 1032 and/or 1072 or processors 1030 and/or 1070 described below, and/or can be executed by processors 1030 and/or 1070 to perform the disclosed functions.

In an embodiment, each data stream is transmitted over a respective transmit antenna. TX data processor 1014 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by processor 1030.

The modulation symbols for all data streams are then provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In certain embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1022a through 1022t are then transmitted from $N_T$ antennas 1024a through 1024t, respectively.

At receiver system 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective received signal, digitizes the conditioned signal to provide samples, and further processes the samples to provide a corresponding "received" symbol stream.

An RX data processor 1060 then receives and processes the $N_R$ received symbol streams from $N_R$ receivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010.

A processor 1070 periodically determines which pre-coding matrix to use. Processor 1070 formulates a reverse link message comprising a matrix index portion and a rank value portion.

The reverse link message can comprise various types of information regarding the communication link and/or the received data stream. The reverse link message is then processed by a TX data processor 1038, which also receives traffic data for a number of data streams from a data source

1036, modulated by a modulator 1080, conditioned by transmitters 1054a through 1054r, and transmitted back to transmitter system 1010.

At transmitter system 1010, the modulated signals from receiver system 1050 are received by antennas 1024, conditioned by receivers 1022, demodulated by a demodulator 1040, and processed by a RX data processor 1042 to extract the reserve link message transmitted by the receiver system 1050. Processor 1030 determines which pre-coding matrix to use for determining the beamforming weights then processes the extracted message.

Processors 1030 and 1070 can direct (e.g., control, coordinate, manage, etc.) operation at transmitter system 1010 and receiver system 1050, respectively. Respective processors 1030 and 1070 can be associated with memory 1032 and 1072 that store program codes and data. For example, processors 1030 and 1070 can perform functions described herein with respect to associating UEs with relays, and/or can operate one or more of the corresponding components/modules. Similarly, memory 1032 and 1072 can store instructions for executing the functionality or components/modules, and/or related data.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software/firmware, or combinations thereof. If implemented in software/firmware, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the widest scope consistent with the principles and novel features disclosed herein. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for associating a user equipment (UE) with a relay in a wireless network, comprising:
    determining a relay backhaul link quality of the relay;
    determining a path loss from the UE to the relay; and
    comparing the relay backhaul link quality to a direct link quality between the UE and a base station, and the path loss to a path loss threshold to determine whether to associate the UE with the relay.

2. The method of claim 1, wherein determining a relay backhaul link quality comprises:
    determining when the relay is operating in the wireless network; and approximating the relay backhaul link quality as a worst case relay backhaul link quality when the relay is operating in the wireless network.

3. The method of claim 1, further comprising associating the UE with the relay when the relay backhaul link quality is different from the direct link quality by at least a quality threshold and the path loss is less than the path loss threshold.

4. The method of claim 3, wherein associating the UE to the relay comprises:
determining a set of relays having associated relay backhaul link qualities that are different from the direct link quality by at least the quality threshold;
selecting the relay in the set of relays based on the respective relay backhaul link quality of a plurality of relays in the set of relays; and
associating the UE with the selected relay.

5. The method of claim 4, wherein selecting the relay in the set of relays comprises selecting the relay with a best relay backhaul link quality.

6. The method of claim 4, wherein selecting the relay in the set of relays comprises:
determining a best relay backhaul quality from a set of relay backhaul link qualities corresponding to the plurality of relays in the set of relays; and
selecting the relay from the set of relays having a relay backhaul link quality no more than a threshold less than the best relay backhaul link quality.

7. The method of claim 3, wherein associating the UE to the relay comprises:
determining a list of relays, including the relay, having respective path losses from the UE that are less than the path loss threshold;
ordering the list of relays based on one or more criteria; and
selecting the relay from the list of relays for associating to the UE based on one or more comparisons.

8. The method of claim 7, wherein the one or more criteria comprises one or more of: relay backhaul link qualities of the relays in the list of relays, whether the relays in the list of relays serve at least one UE, a number of UEs served by the relays in the list of relays, or the respective path losses from the UE.

9. The method of claim 7, wherein the one or more comparisons comprise one or more of:
a first metric to a first threshold, wherein the first metric is based on a path loss from the UE to a first relay and a second path loss from the UE to a second relay;
a second metric to a second threshold, wherein the second metric is based on the path loss from the UE to the first relay and a third path loss from the relay to another UE served by another relay;
a third metric to a third threshold, wherein the third metric is based on a relay path loss from the relay to another relay; and
a fourth metric to the direct link quality, wherein the fourth metric is based on the relay backhaul link quality and a fourth threshold.

10. The method of claim 9, further comprising selecting the first threshold and the second threshold to avoid range expansion.

11. The method of claim 9, further comprising selecting the third threshold to mitigate interference with mobility of the UE.

12. The method of claim 9, further comprising selecting the fourth threshold to offload the UE to the relay.

13. An apparatus for associating a user equipment (UE) with a relay in a wireless network, comprising:

means for determining a relay backhaul link quality of the relay;
means for determining a path loss from the UE to the relay; and
means for comparing the relay backhaul link quality to a direct link quality between the UE and a base station, and the path loss to a path loss threshold to determine whether to associate the UE with the relay.

14. The apparatus of claim 13, wherein the means for determining a relay backhaul link quality is configured to:
determine when the relay is operating in the wireless network; and
approximate the relay backhaul link quality as a worst case relay backhaul link quality when the relay is operating in the wireless network.

15. The apparatus of claim 13, further comprising means for associating the UE with the relay when the relay backhaul link quality is different from the direct link quality by at least a quality threshold and the path loss is less than the path loss threshold.

16. The apparatus of claim 15, wherein the means for associating the UE to the relay is configured to:
determine a set of relays having associated relay backhaul link qualities that are different from the direct link quality by at least the quality threshold;
select the relay in the set of relays based on the respective relay backhaul link quality of a plurality of relays in the set of relays; and
associate the UE with the selected relay.

17. The apparatus of claim 16, wherein the means for selecting the relay in the set of relays is configured to select the relay with a best relay backhaul link quality.

18. The apparatus of claim 16, wherein the means for selecting the relay in the set of relays is configured to:
determine a best relay backhaul quality from a set of relay backhaul link qualities corresponding to the plurality of relays in the set of relays; and
select the relay from the set of relays having a relay backhaul link quality no more than a threshold less than the best relay backhaul link quality.

19. The apparatus of claim 15, wherein the means for associating the UE to the relay is configured to:
determine a list of relays, including the relay, having respective path losses from the UE that are less than the path loss threshold;
order the list of relays based on one or more criteria; and
select the relay from the list of relays for associating to the UE based on one or more comparisons.

20. The apparatus of claim 19, wherein the one or more criteria comprises one or more of: relay backhaul link qualities of the relays in the list of relays, whether the relays in the list of relays serve at least one UE, a number of UEs served by the relays in the list of relays, or the respective path losses from the UE.

21. The apparatus of claim 19, wherein the one or more comparisons comprise one or more of:
a first metric to a first threshold, wherein the first metric is based on a path loss from the UE to a first relay and a second path loss from the UE to a second relay;
a second metric to a second threshold, wherein the second metric is based on the path loss from the UE to the first relay and a third path loss from the relay to another UE served by another relay;
a third metric to a third threshold, wherein the third metric is based on a relay path loss from the relay to another relay; and a fourth metric to the direct link quality, wherein the fourth metric is based on the relay backhaul link quality and a fourth threshold.

22. An apparatus for associating a user equipment (UE) with a relay in a wireless network, comprising:
a processing system configured to:
determine a relay backhaul link quality of the relay;
determine a path loss from the UE to the relay; and
compare the relay backhaul link quality to a direct link quality between the UE and a base station, and the path loss to a path loss threshold to determine whether to associate the UE with the relay.

23. The apparatus of claim 22, wherein to determine a relay backhaul link quality, the processing system is configured to:
determine when the relay is operating in the wireless network; and
approximate the relay backhaul link quality as a worst case relay backhaul link quality when the relay is operating in the wireless network.

24. The apparatus of claim 22, the processing system further configured to associate the UE with the relay when the relay backhaul link quality is different from the direct link quality by at least a quality threshold and the path loss is less than the path loss threshold.

25. The apparatus of claim 24, wherein to associate the UE to the relay, the processing system is further configured to:
determine a set of relays having associated relay backhaul link qualities that are different from the direct link quality by at least the quality threshold;
select the relay in the set of relays based on the respective relay backhaul link quality of a plurality of relays in the set of relays; and
associate the UE with the selected relay.

26. The apparatus of claim 25, the processing system further configured to select the relay with a best relay backhaul link quality.

27. The apparatus of claim 25, the processing system further configured to:
determine a best relay backhaul quality from a set of relay backhaul link qualities corresponding to the plurality of relays in the set of relays; and
select the relay from the set of relays having a relay backhaul link quality no more than a threshold less than the best relay backhaul link quality.

28. The apparatus of claim 24, wherein to associate the UE to the relay, the processing system is configured to:
determine a list of relays, including the relay, having respective path losses from the UE that are less than the path loss threshold;
order the list of relays based on one or more criteria; and
select the relay from the list of relays for associating to the UE based on one or more comparisons.

29. The apparatus of claim 28, wherein the one or more criteria comprises one or more of: relay backhaul link qualities of the relays in the list of relays, whether the relays in the list of relays serve at least one UE, a number of UEs served by the relays in the list of relays, or the respective path losses from the UE.

30. The apparatus of claim 28, wherein the one or more comparisons comprise one or more of:
a first metric to a first threshold, wherein the first metric is based on a path loss from the UE to a first relay and a second path loss from the UE to a second relay;
a second metric to a second threshold, wherein the second metric is based on the path loss from the UE to the first relay and a third path loss from the relay to another UE served by another relay;
a third metric to a third threshold, wherein the third metric is based on a relay path loss from the relay to another relay; and
a fourth metric to the direct link quality, wherein the fourth metric is based on the relay backhaul link quality and a fourth threshold.

31. A computer program product for associating a user equipment (UE) with a relay in a wireless network, comprising:
a computer-readable medium comprising code for:
determining a relay backhaul link quality of the relay;
determining a path loss from the UE to the relay; and
comparing the relay backhaul link quality to a direct link quality between the UE and a base station, and the path loss to a path loss threshold to determine whether to associate the UE with the relay.

32. The computer program product of claim 31, wherein code for determining a relay backhaul link quality comprises code for:
determining when the relay is operating in the wireless network; and
approximating the relay backhaul link quality as a worst case relay backhaul link quality when the relay is operating in the wireless network.

33. The computer program product of claim 31, further comprising code for associating the UE with the relay when the relay backhaul link quality is different from the direct link quality by at least a quality threshold and the path loss is less than the path loss threshold.

34. The computer program product of claim 33, wherein code for associating the UE to the relay comprises code for:
determining a set of relays having associated relay backhaul link qualities that are different from the direct link quality by at least the quality threshold;
selecting the relay in the set of relays based on the respective relay backhaul link quality of a plurality of relays in the set of relays; and
associating the UE with the selected relay.

35. The computer program product of claim 34, wherein code for selecting the relay in the set of relays comprises code for selecting the relay with a best relay backhaul link quality.

36. The computer program product of claim 34, wherein code selecting the relay in the set of relays comprises code for:
determining a best relay backhaul quality from a set of relay backhaul link qualities corresponding to the plurality of relays in the set of relays; and
selecting the relay from the set of relays having a relay backhaul link quality no more than a threshold less than the best relay backhaul link quality.

37. The computer program product of claim 33, wherein code associating the UE to the relay comprises code for:
determining a list of relays, including the relay, having respective path losses from the UE that are less than the path loss threshold;
ordering the list of relays based on one or more criteria; and
selecting the relay from the list of relays for associating to the UE based on one or more comparisons.

38. The computer program product of claim 37, wherein the one or more criteria comprises one or more of: relay backhaul link qualities of the relays in the list of relays, whether the relays in the list of relays serve at least one UE, a number of UEs served by the relays in the list of relays, or the respective path losses from the UE.

39. The computer program product of claim 37, wherein the one or more comparisons comprise one or more of:

a first metric to a first threshold, wherein the first metric is based on a path loss from the UE to a first relay and a second path loss from the UE to a second relay;

a second metric to a second threshold, wherein the second metric is based on the path loss from the UE to the first relay and a third path loss from the relay to another UE served by another relay;

a third metric to a third threshold, wherein the third metric is based on a relay path loss from the relay to another relay; and a fourth metric to the direct link quality, wherein the fourth metric is based on the relay backhaul link quality and a fourth threshold.

* * * * *